United States Patent
Cave

[11] Patent Number: 5,694,308
[45] Date of Patent: Dec. 2, 1997

[54] METHOD AND APPARATUS FOR REGULATED LOW VOLTAGE CHARGE PUMP

[75] Inventor: Michael Cave, Pflugerville, Tex.

[73] Assignee: Motorola, Inc., Schaumburg, Ill.

[21] Appl. No.: 498,274

[22] Filed: Jul. 3, 1995

[51] Int. Cl.[6] ............... H02M 7/62; H02M 3/18
[52] U.S. Cl. ............... 363/59; 307/110
[58] Field of Search ............... 363/59, 60, 61; 307/109, 110; 320/1

[56] References Cited

U.S. PATENT DOCUMENTS

| | | | |
|---|---|---|---|
| 4,883,976 | 11/1989 | Deane | 307/291.2 |
| 5,003,197 | 3/1991 | Nojima et al. | 307/296.2 |
| 5,051,981 | 9/1991 | Kline | 370/32.1 |
| 5,193,198 | 3/1993 | Yokouchi | 395/750 |
| 5,307,028 | 4/1994 | Chen | 331/1 A |
| 5,389,898 | 2/1995 | Taketoshi et al. | 331/2 |
| 5,392,205 | 2/1995 | Zavaleta | 363/59 |
| 5,399,956 | 3/1995 | DeLuca et al. | 323/222 |
| 5,416,446 | 5/1995 | Holler, Jr. et al. | 331/57 |
| 5,477,196 | 12/1995 | Yamauchi et al. | 331/60 |
| 5,483,486 | 1/1996 | Javanifard et al. | 365/185.17 |

OTHER PUBLICATIONS

K. Ogata; "Modern Control Engineering;" Second Edition; Ch. 7 Lag–Lead Compensation; pp. 576–577 (1990).

*Primary Examiner*—Peter S. Wong
*Assistant Examiner*—Bao Q. Vu
*Attorney, Agent, or Firm*—J. Gustav Larson

[57] ABSTRACT

Generation of an output voltage (28) greater than that of a reference voltage (20) is accomplished using a self starting low voltage charge pump (10). A start-up clock circuit (12) comprising a ring oscillator (40) is used to generate a ting oscillator clock signal (63) which can be used allow the charge pump (10) to begin operation before an external clock signal (44) is available.

13 Claims, 5 Drawing Sheets

METHOD AND APPARATUS FOR REGULATED LOW VOLTAGE CHARGE PUMP

FIELD OF THE INVENTION

This invention relates generally to voltage generator circuits, and more specifically to a method and apparatus for a low voltage regulated charge pump.

BACKGROUND OF THE INVENTION

In some integrated circuits, it is necessary to increase an available power supply voltage to provide to internal circuitry. For example, electrically erasable programmable read only memories (EEPROMs) require a voltage substantially above the conventional +3.0 volt or +5.0 volt power supply to program a memory location. In addition, in battery powered applications, it can be necessary to provide devices a fixed voltage above the battery voltage to power some or all of a circuit. This is especially true if the circuit contains mixed mode functions, where the voltage needed to power the analog portion is different than the voltage needed to power the digital portion. When a voltage greater than the supply voltage is needed, it becomes necessary to generate an internal voltage above the available supply voltage. A charge pump circuit is used to provide a desired internal voltage above the available supply voltage. A conventional technique to increase the internal voltage is to use a charge pump as a voltage multiplier circuit. The voltage multiplier circuit is based on a charging capacitor and two phases of a clock. During one clock phase, the power supply voltage is applied to a first terminal of the charging capacitor while the second terminal is grounded. Then during the second phase, the power supply voltage source is isolated from the first terminal of the charging capacitor. The second terminal is disconnected from ground, and the power supply voltage is applied to the second terminal. Thus, the first terminal is boosted to a voltage of twice the power supply voltage as referenced to ground. Repetition of this technique can provide other integer multiple values of the original power supply voltage. This integer multiple value of the original voltage can be regulated down to a non-integer multiple value as needed.

Prior art charge pumps, as discussed above, require a clock signal to produce the two phases. It is well known to use an Phase Locked Loop circuit (PLL) to provide this clock signal. One problem with the use of PLLs is that they require a power source of approximately 2.7 volts to generate a clock signal. If a new AA battery has a charge of 1.8 volts, it is apparent that a single battery application is not possible with an analog PLL requiring 2.6 volts to start-up. In addition, allowing applications to operated below 2.6 volts will a provide extended battery life.

Therefore, a need exists for a charge pump that can start-up and operate from voltages less that 2.6 volts

DETAILED DESCRIPTION OF A PREFERRED EMBODIMENT

Generally, the present invention provides a method and apparatus for a self starting low voltage charge pump circuit 10. This is accomplished by generating a clock signal 14 at low voltages allowing the charge pump to begin operation. For example, the start-up clock circuit 12 of FIG. 1 will produce a clock signal 14 on start-up, even if no external clock 44 is present. With such a method or apparatus, a low voltage charge pump circuit 10 is provided that can start-up and operate at low voltages.

Figure 1:
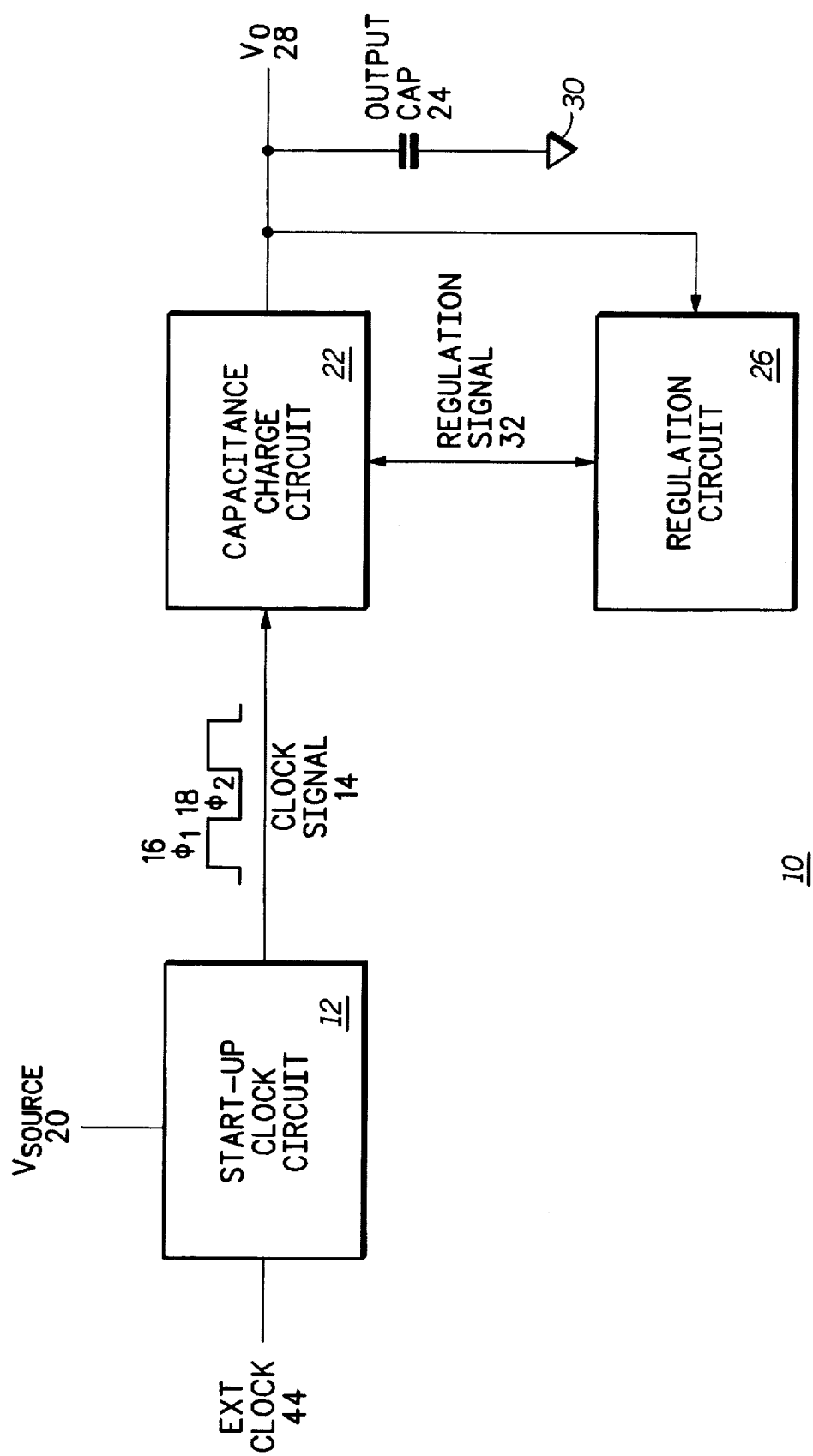
FIG. 1 illustrates in block form a regulated low voltage charge pump in accordance with the present invention.

FIG. 1 illustrates in block form a low voltage charge pump circuit 10 that includes a start-up clock circuit 12, a capacitance charge circuit 22, a regulation circuit 26, and an output capacitor 24.

In accordance with the present invention, the start-up clock circuit 12 is coupled to a low voltage supply Vsource 20 and receives an external clock signal 44. The start-up clock circuit 12 generates a clock signal 14. The clock signal 14 has two non-overlapping clock phases, a first clock phase ø1 and a second clock phase ø2. The start-up clock circuit 12 can generate the clock signal 14 independent of the presence of an external clock signal 44. For example, if on start-up no external clock 44 is received, the start-up clock circuit 12 will generate an internal clock in order to provide the clock signal 14. The start-up clock circuit 12 can generate the clock signal 14 based on the external clock 44 once it becomes available.

The capacitance charge circuit 22 receives the clock signal 14, and a regulation signal 32. The capacitance charge circuit 22 acts as a charge pump, applying the low voltage supply 20 to a conventional charge-pump in order to generate an a predetermined voltage level or output voltage Vo The output capacitor 24 is connected between the node of the capacitance charge circuit 22 that produces Vo, and a common reference 30 or ground. The output capacitor 24 is charged to the voltage Vo. External loads or circuitry are connected to the output capacitor node 24 that is charged to Vo. For example, the low voltage charge pump circuit 10 could be used in a 1.8 volt system where there is a sub-system that requires a three-volt signal. This could be accomplished from a single 1.8 volt supply by having the capacitance charge circuit 22 provide a Vo of three volts, and connecting the sub-system requiring the three volt supply to the output capacitor node at which Vo is present.

The regulation circuit 26 is coupled to the output capacitor 24 node at which Vo is generated. The regulation circuit 26 monitors the voltage Vo, and produces a regulation signal 32. As the value of Vo rises above or below the desired Vo value, the regulation circuit 26 will alter the value of the regulation signal 32 so that based on the regulation signal 32 value, the capacitance charge circuit 22 can make the necessary adjustments to assure a stable voltage at Vo. This feedback loop is especially useful if the voltage Vo is used to drive an AC load such as a speaker or other analog output.

Figure 2:
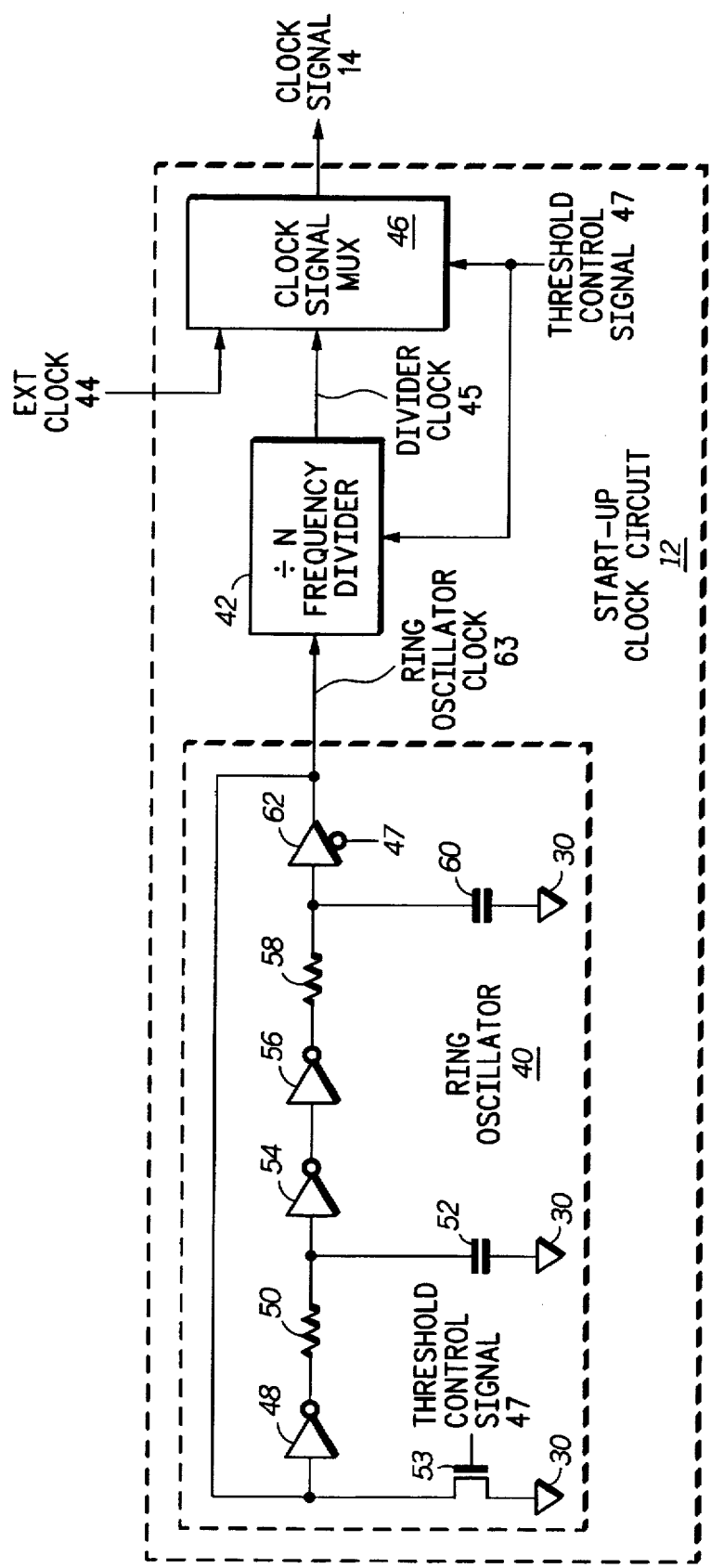
FIG. 2 illustrates in block and schematic form a start-up clock circuit from the low voltage charge pump of FIG. 1 in accordance with the present invention.

FIG. 2 illustrates one embodiment of the start-up clock circuit 12. The start-up clock circuit 12 is implemented using a ring oscillator 40, a frequency divider 42, and a clock signal multiplexer 46. The ring oscillator 40 receives power from the low voltage supply 20, and consists of a first inverter 48, a second inverter 54, a third inverter 56, a tri-state buffer 62, a first resistor 50, a second resistor 58, a first capacitor 52, a second capacitor 60, and an N-channel transistor 53. The first resistor 50 is coupled in series between the output of the first inverter 48 and the input of the second inverter 54. The output of the second inverter 54 is connected to the input of the third inverter 56. The second resistor 58 is coupled in series between the output of the third inverter 56 and the input of the tri-state buffer 62. The output of the tri-state buffer 62 represents an ring oscillator clock 63, and is connected to the input of the first inverter 48. The tri-state enable signal of tri-state buffer 56 is connected to a threshold control signal 47. The first capacitor 52 is connected between the input of inverter 54 and a common reference 30. The second capacitor 60 is connected between the input of the tri-state buffer's 62 gate and the common reference 30. The transistor 53 is connected between the input of the first inverter 48 and the common reference 30 with its gate connected to the threshold control signal 47.

The ring oscillator 40 has two modes of operation, an oscillation mode and a steady-state mode. In the oscillation mode, the threshold control signal 47 is chosen so that the transistor 53 is off (not conducting), and the tri-state buffer 62 is on. When in the oscillation mode, the ring oscillator clock signal 63 is fed back into the first inverter 48, assuming the ring oscillator clock signal was high, the output of the first inverter 48 now becomes low. This low signal is inverted again by the second inverter 54 to produce a high signal at its output. This high signal is input to the third inverter 56 which produces a low at its output. The low signal at the output of the third inverter 56 is input to the tri-state buffer 62, which passes the high signal to its output, thereby changing the polarity of the ring oscillator clock 63 from a high to a low. This sequence of events repeats to produce the ring oscillator clock 63. The frequency of the internal clock signal is controlled by two Resistor-Capacitor (RC) time constants. The first RC time constant is generated by the combination of the first resistor 50, and the first capacitor 52. The second RC time constant is generated by the combination of the second resistor 58, and the second capacitor 60. In the preferred embodiment, ring oscillator is biased to provide a frequency of approximately four megahertz.

The steady-state mode of the ring oscillator 40 is entered by choosing the threshold control signal 47 such that it acts as a disable input by assuring that transistor 53 is on (conducting), and the tri-state buffer 62 is tri-stated (off). When the tri-state buffer 62 is in tri-state, its output will be pulled low through transistor 53 which is now conducting. The input to the first inverter 48 is, therefore, low. In the manner described above, this signal will propagate to the tri-state buffer 56. The output of the tri-state node, and hence the ring oscillator clock 63 will stay low until the threshold value changes to allow the ring oscillator 40 to transition from steady-state mode to oscillation mode as previously described.

The ring oscillator clock 63 is coupled to a divide by N frequency divider 42, where N is an integer value. The divider 42 produces a divider clock signal 45. The value of N may be fixed or variable. In the preferred embodiment N would be variable, as will be discussed later.

The divider clock 45 and an external clock 44 are coupled to a clock signal multiplexer 46. Based on the value of the threshold control signal, the clock signal multiplexer 46 routes one of the two clocks to generate a clock signal 14. The threshold control signal 47 comprises a clock ready signal and a voltage level trip signal. In the preferred embodiment, the clock ready signal is a PLL lock signal. While, the voltage level trip signal is generated by a supply voltage sensing circuit which indicates when 2.5 volts, 2.8 volts and 3.2 volts have been reached at Vo.

The present invention uses the threshold control signal 47 to change the value of N on the frequency divider 42, in effect generating multiple frequencies on the clock signal 14. For Vo from zero volts and 2.5 volts, N is equal to 4. For Vo from 2.5 volts to 2.8 volts, N is equal to 2. For output voltages from 2.8 volts to 3.2 volts, N is equal to 1. The clock signal mux is coupled such that from zero volts to 3.2 volts, the divider clock signal 45 is passed. The clock signal mux 46 will pass the external clock 44 once the PLL lock signal is active and 3.2 volts has been reached. The need for multiple frequency values will be discussed later.

Figure 3:
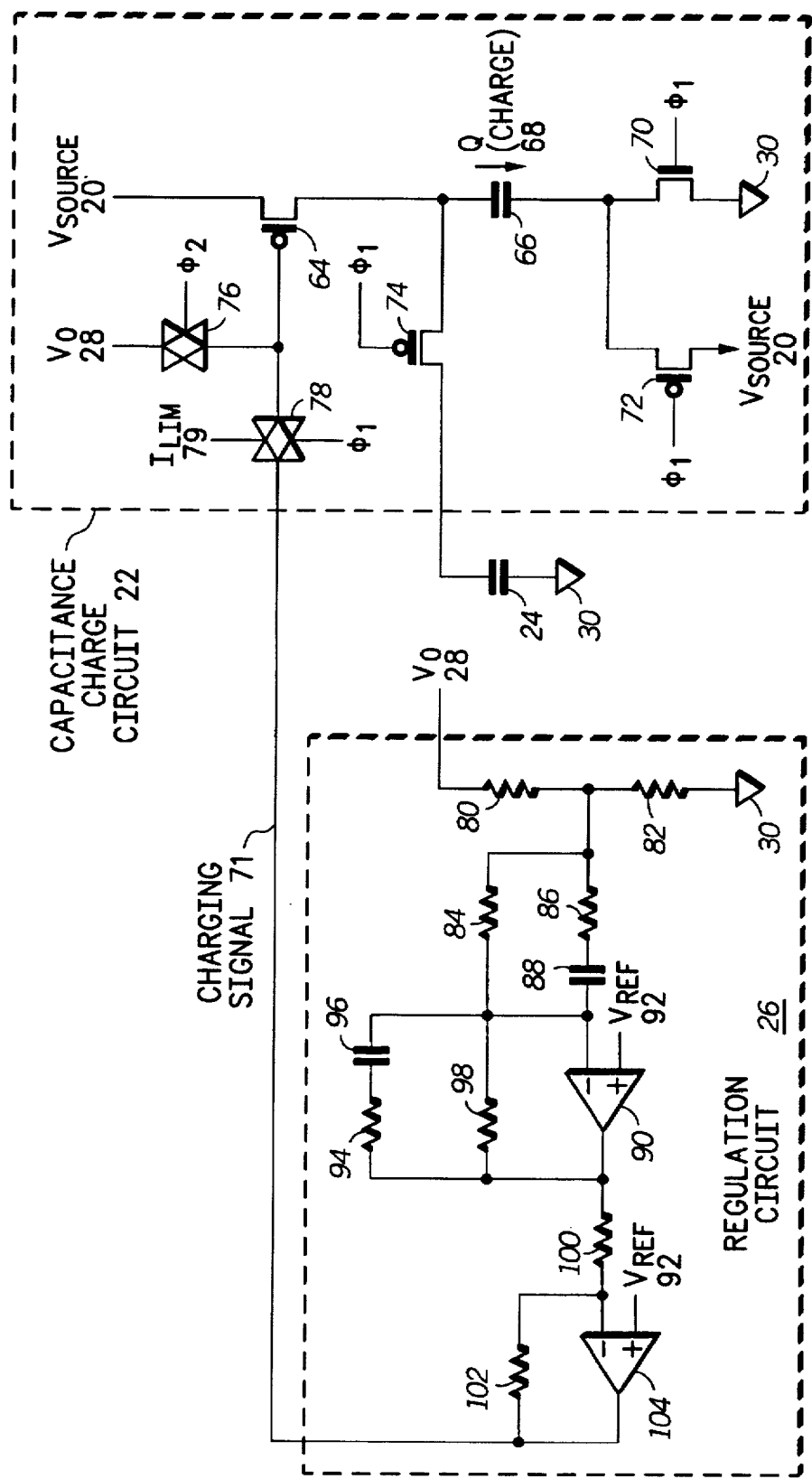
FIG. 3 illustrates in schematic form a regulation circuit and capacitance charge circuit from the low voltage charge pump of FIG. 1 in accordance with the present invention.

FIG. 3 illustrates, in schematic form, the capacitance charge circuit 22 and the regulation circuit 26. The capacitance charge circuit 22 operates as a charge pump, and is well know by one skilled in the art. In the preferred embodiment, the charge circuit 22 comprises a current limiting transmission gate 78, a transmission gate 76, a first P-channel transistor 64, a second P-channel transistor 74, a third P-channel transistor 72, an N-channel transistor 70, a capacitor 66, and receives a charging signal 71, a current limiting signal 79, a first clock phase signal ø1, and a second clock phase signal ø2. The third P-channel transistor 72 is connected between a first node of the capacitor 66 and Vsource 20. The transistor 72 is driven by ø1. The N-channel transistor 70 is connected between the first node of the capacitor 66 and ground 30. Its base is driven by ø1. In this configuration, the first node of the capacitor 66 will be connected to ground when ø1 is active, or high, and connected to Vsource when ø1 is inactive, or low. The second node of capacitor 66 is connected a first node of the first P-channel transistor 64 and to a first node of the second P-channel transistor 74. The second node of the first transistor 64 is connected to Vsource 20, and its gate is connected to a first node of the current limiting transmission gate 78, and a first node of the transmission gate 76. The second node of the transmission gate 76 is connected to Vo, and is turned on by signal ø2. The second node of the current limiting transmission gate 78 is connected to the charging signal 71, and is turned on by ø1. In addition, the rate at which current flows through the current limiting transmission gate 78 is controlled by the current limiting signal 79. The second node of the second P-channel transistor is connected to Vo, and is controlled by ø1. As would be well known to one skilled in the art, appropriately biased N-channel transistors could be used in place of the P-channel transistor to reduce overall system space.

As is well known to one skilled in the art, the basic operation of the capacitance charge circuit 22 consists of placing a desired voltage across the first and second node of a capacitor 66 during a first clock cycle ø1. This voltage is referenced a common voltage potential by connecting the second node of the capacitor to ground. During a second clock phase ø2, the source providing the charge to the capacitor is disconnected, and the referencing voltage at the capacitors second node, is switched from ground to a voltage source, Vsource 20. This has the effect of producing a voltage at the first node of the capacitor equal to the desired voltage plus the voltage source.

In the preferred embodiment, the desired voltage across the first and second node of the capacitor 66 is generated by applying a charge Q 68 to the capacitor. The charge Q is controlled by the charging signal 71. The charging signal 71 is received at a first node of the current limiting transmission gate 78. During the first clock phase ø1, the transmission gate 78 allows a representation of the charging signal to pass to the second node of the current limiting transmission gate 78. The second node of the current limiting transmission gate 78 is connected to the gate of the first P-channel transistor 64. Based on the value of the original charging signal 71, a charge Q 68 is passed through the first P-channel transistor, and received at the capacitor 66. During this phase the first node of the capacitor 66 is connected to ground through transistor 70. During the second clock phase ø2, the current limiting transmission gate 78 is turned off, and in its place transmission gate 76 is turned on. By turning on transmission gate 76, the base of the P-channel transistor 64 is pulled to the value Vo. This will, in normal operation, turn off the P-channel transistor 64, prohibiting flow of charge Q 68 to the capacitor 66. In addition during ø2, transistor 70 turns off, while transistor 72 turns on, allowing the capacitor referencing voltage to switch from ground 30 to Vsource 20. Also during ø2, P-channel transistor 74 turns on, allowing the charge across the capacitor 66 to be shared with an external capacitor 24. The voltage across the external capacitor 24 is Vo. Since the voltage at the second node of the capacitor 66 during ø2 with respect to ground 30 is the reference voltage seen through transistor 72 with respect to ground, and the voltage across the capacitor 66. As discussed above, this value is Vsource+V source if the capacitor is fully charged.

In order to reduce system noise, a current limiting transmission gate 79 is used. The signal Ilim 79 can be used to vary the impedance of the path through the transmission gate 78. The added impedance has the effect of slowing down the rate at which P-channel capacitor 64 is turned on. As is well known in the art, this is a common practice for reducing system noise.

Figure 9:
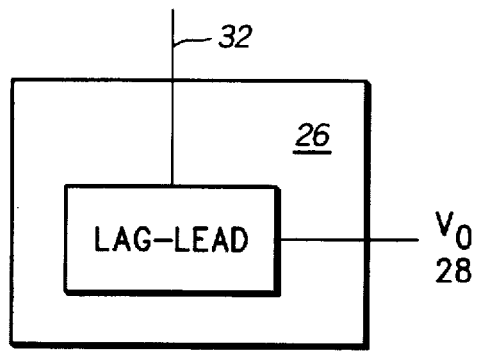
FIG. 9 illustrates in block form a specific implementation of element 26 of FIG. 1.

FIG. 3 also illustrates a schematic representation of the regulation circuit 26. As is well known to one skilled in the art, there are any number of regulation circuits which could be used to provide feedback control the output voltage Vo. The capacitance charge circuit 22 of FIG. 3 requires current limited feedback, as opposed to a pulse width modulated type feedback signal. The regulation circuit 26 chosen is a lag-lead compensator, see FIG. 9, using operational amplifiers. The use of lag-lead compensation is well known in the art to have the transient response advantages of a lead compensator, by increasing frequency bandwidth and response, as well as decreasing the maximum overshoot in a step response; while simultaneously having the steady-state response advantages lag compensation, by increasing the low-frequency gain. In addition, the use of a lag-lead compensator requires only two amplifiers biased such that their frequency bandwidth is greater that the overall bandwidth of the system. The overall frequency response of the system is 8 Khz.

Figure 4:
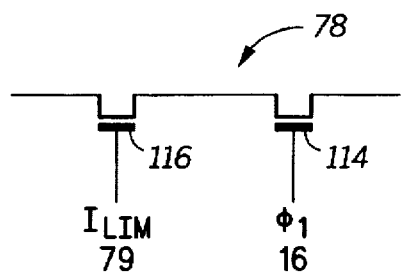
FIG. 4 illustrates in schematic form a current limiting transmission gate from FIG. 3 in accordance with the present invention.

FIG. 4 illustrates a schematic representation of the current limiting transmission gate 78. The transmission gate 78 consists of two N-channel transistors 116 and 114 connected in series. N-channel transistor 114 is driven by ø1, while the other N-channel transistor 116 is driven by the current limiting signal Ilim 79. In this configuration, ø1 can turn the transmission gate on, while Ilim 79 can control the impedance of the path through the circuit.

Figure 5:
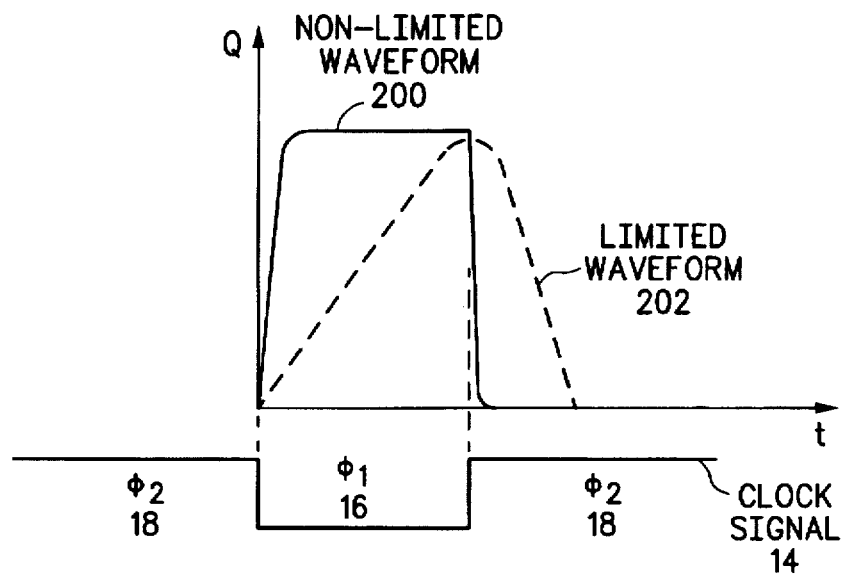
FIG. 5 illustrates in graph form the time-charge relationship of a charging node in accordance with the present invention.

FIG. 5 illustrates, in graphic form, the effect of using the current limiting feature of transmission gate 78. If no current limiting is being performed, a non-limited wave form 200 would be generated. This wave form represents the amount of charge available to the capacitor 66 with respect to time. This charge is only available during ø1, and sharp edges corresponding to the presence of phase ø1. The limited wave form 202 represents the charge available to the capacitor 66 if the current is limited through transmission gate 78. The wave form 202 has edges more sloped that those of the non-limited wave form 200. Since capacitor 66 is only being charged during ø1, it is readily seen from the graph that when current limiting is taking place there can be significantly less charge available to the capacitor. This reduction in charge causes the charge pump 10 to take longer to start-up. One way to overcome the issue of increased start-up time is to use a clock signal with a lower frequency. By using a slower clock, the time ø1 is present is longer, and more charge will be made available to the capacitor 66. At start-up, the present invention uses a slower frequency clock signal 14. This allows the capacitor 66, which has no charge at start up, to receive more charge in less time. As Vo rises, faster clocks can be used since less charge in needed as the capacitor 66 approaches Vo. The faster clocks are generated as described in the divider circuit 42.

Figure 6:
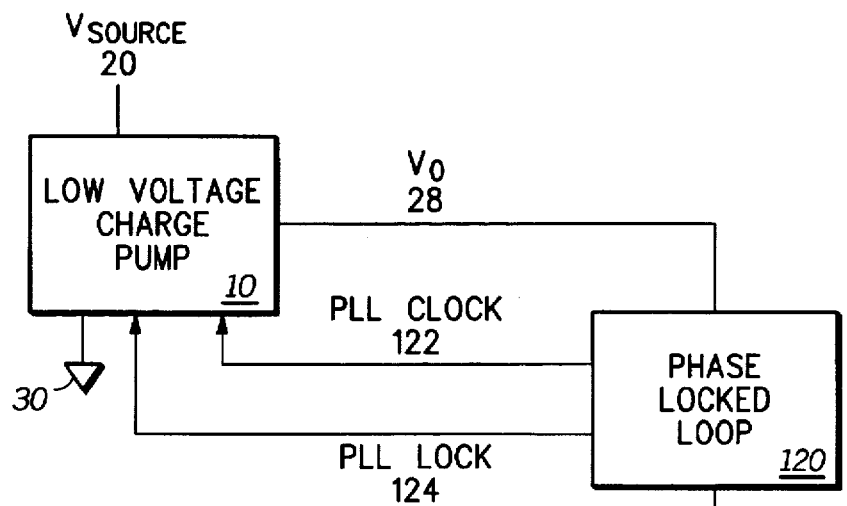
FIG. 6 illustrates in block form a low voltage charge pump coupled to a phase locked loop circuit in accordance with the present invention.

FIG. 6 illustrates a block diagram representation of the low voltage charge pump circuit 10 coupled to an analog PLL. In this configuration, the PLL is powered by Vo, the voltage generated by the charge pump. Being an analog PLL, it will not be operable for voltages below 2.6 volts, hence the need for the internally generated clock signal 14. The PLL clock signal 122 and the PLL lock signal 124 are coupled to the low voltage charge pump 10. The charge pump 10 receives the PLL clock 122 as the external clock 44 and the PLL lock 124 as part of the threshold control signal 47.

Figure 8:
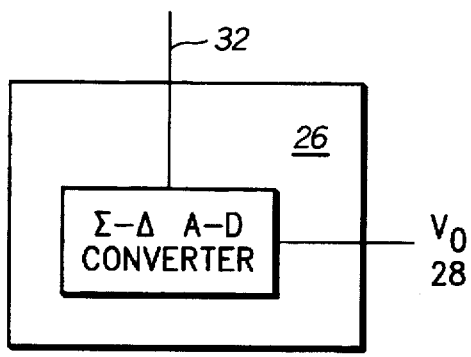
FIG. 8 illustrates in block form a specific implementation of element 26 of FIG. 1.

The present invention anticipates other combinations of regulation circuits 26 and capacitance charge circuits 22. For example, it is well know in the art to use capacitance charge circuits 22 that charge a capacitor 66 based on a variable pulse signal such as a pulse width modulated (PWM) signal. Such a capacitance charge circuit 22 would be coupled with a regulation circuit 26 which generates the needed variable pulse signal. One circuit which could operate as such a regulation circuit 26 would be a sigma-delta type analog to digital converter ($\Sigma$-$\Delta$), as illustrated in FIG. 8. The $\Sigma$-$\Delta$ converter receives an analog input, and based on its value, produces a variable pulse signal.

Another possible configuration of the present invention would include pulling the charging signal 71 of FIG. 3 to ground until the desired 35 output voltage Vo is reached or exceeded. This assures that as much charge 68 as possible will be supplied to the capacitor 66.

Figure 7:
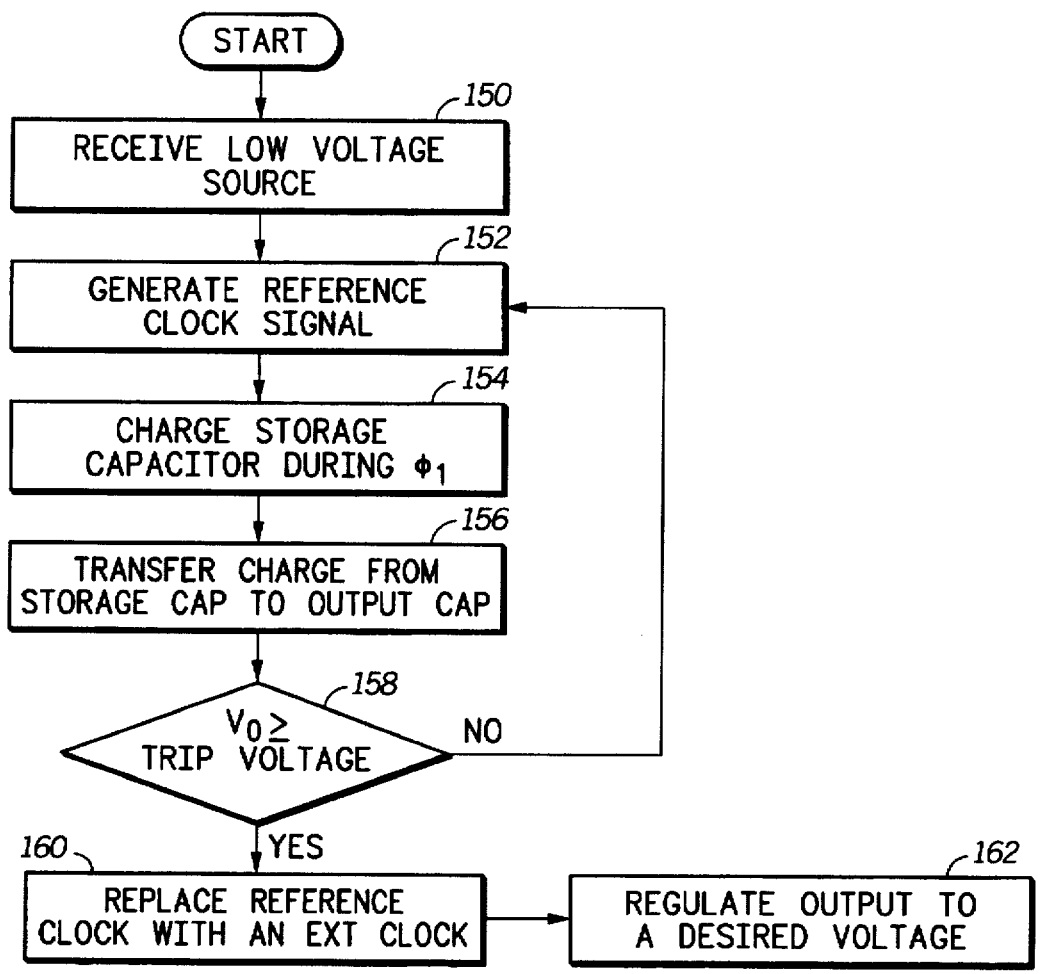
FIG. 7 illustrates in flow chart form the steps needed to provide a self starting low voltage charge pump in accordance with the present invention.

FIG. 7 illustrates a method for generating a low voltage charge pump. At step 150 a low-voltage voltage source is received. This voltage source will likely be from a battery. At step 152, a reference clock signal is generated. This clock signal is capable of being generated at a voltage level equal to the voltage source which can be below 2.6 volts. At step 154, a storage capacitor is charged during a first phase (ø1) of the clock signal. At step 156, the charge contained in the storage capacitor is transferred, or shared, with an output capacitor. The voltage across the output capacitor is the output voltage Vo. At step 158, the output voltage Vo is compared to a trip voltage. If the output voltage Vo is less than the trip voltage, steps 152 through 158 are repeated. If the output voltage Vo is greater than, or equal to, the trip voltage, then flow proceeds to step 160. At step 160, the reference clock is replace with an external clock. At step 162, regulation of the output voltage to a desired level is performed.

I claim:

1. A low voltage charge pump comprising:
   start-up clock circuit that produces a clock signal having a first clock phase and a second clock phase, and the start-up clock circuit operates from a supply voltage having a voltage difference of less than 2.6 volts between a voltage source and a common reference, wherein during a startup period the clock signal is produced without the presence of an external clock;
   an output capacitor having a first terminal coupled to a reference voltage terminal, and a second terminal for providing an output voltage;
   capacitance charge circuit comprising:
      a current limiting device operably coupled to receive the clock signal, a first charge signal, a current limiting input signal, and to provide a second charge signal, wherein the current limiting device controls a rate of change of the second charge signal based on the current limiting input signal and the first charge signal;
      a charge circuit capacitor operably coupled to receive the second charge signal from the current limiting device, and to the second terminal of the output capacitor, wherein during the first clock phase the charge circuit capacitor is charged based on the second charge signal, and during the second clock phase the charge circuit capacitance is being discharged into the output capacitor to produce an output voltage; and
   regulation circuit operably coupled to receive the output voltage, and to provide the first charge signal, wherein the regulation circuit controls a maximum value of the first charge signal such that the output voltage is regulated.

2. The low voltage charge pump of claim 1, wherein the start-up clock circuit further comprises a ring oscillator that produces a ring oscillator clock signal that functions as the clock signal.

3. The low voltage charge pump of claim 2, wherein the start-up clock circuit further comprises a frequency divider that divides the ring oscillator clock signal when the output voltage is at a predetermined threshold voltage range to produce a divider clock signal.

4. The low voltage charge pump of claim 1, wherein the start-up clock circuit further comprises a clock signal multiplexor operably coupled to the ring oscillator circuit, for providing a divided clock signal as the clock signal when a threshold control signal is in a first state, and the clock signal multiplexor provides the external clock signal as the clock signal when the threshold control signal is in a second state.

5. The low voltage charge pump of claim 4, wherein the threshold control signal is in the first state when the output voltage is less than a trip voltage and subsequently switches to the second state when the output voltage is greater that the trip voltage, or the external clock signal is valid.

6. The low voltage charge pump of claim 3, wherein the ring oscillator comprises a disable input which disables the ring oscillator.

7. The low voltage charge pump of claim 1 further comprises a supply voltage sensing circuit operably coupled to the capacitance charge circuit, wherein, when the supply voltage equals or exceeds the output voltage, the supply voltage sensing circuit produces a control signal that causes the capacitance charge circuit to couple the supply voltage to the output capacitor such that the output voltage is approximately equal to the supply voltage.

8. The low voltage charge pump of claim 1, wherein the regulation circuit further comprises a lag-lead compensator configuration.

9. The low voltage charge pump of claim 1, wherein the current limiting device limits current at a first rate when the output voltage is below a trip voltage, and second current value when the output voltage is above the trip voltage.

10. The low voltage charge pump of claim 1, wherein the regulation circuit further comprises a sigma-delta analog to digital converter.

11. A method for stepping up a low voltage source, the method comprising the steps of:
   a) receiving the low voltage source having a voltage having a voltage difference of less than 2.6 volts between a voltage source and a common reference;
   b) generating a reference clock signal having a first clock phase and a second clock phase from the low voltage source, wherein the reference clock signal is generated without the assistance of an external clock;
   c) charging a storage capacitor at a first charge level during the first clock phase from the low voltage power source;
   d) transferring at least a portion of charge in the storage capacitor to an output capacitor during the second clock phase, for providing an output voltage;
   e) replacing the reference clock signal with an externally received clock signal when a trip voltage is reached; and
   f) regulating the output voltage to a desired voltage by controlling the first charge level.

12. The method of claim 11 for stepping up a low voltage source of claim 1, further comprising the step:
   g) limiting the rate at which the first charge level is asserted and deasscerted.

13. A low voltage charge pump comprising:
   a start-up clock circuit coupled to receive a supply voltage having a voltage difference of less than 2.6 volts between a voltage source and a common reference, a threshold control signal, and having a clock output for providing a variable clock signal having a first clock phase and a second clock phase, wherein the variable clock signal operates at a first frequency when the threshold control signal has a value below a threshold value, and at a second frequency when the threshold control signal has a value above a threshold value;
   an output capacitor having a first terminal coupled to a reference voltage terminal, and a second terminal for providing an output voltage;
   a capacitance charge circuit operably coupled to receive the clock signal, wherein, during the first clock phase, the capacitance charge circuit is being charged, and during the second clock phase, the capacitance charge circuit is being discharged into the output capacitor to produce an output voltage; and
   a regulation circuit operably coupled to receive the output voltage, and providing the first charge signal, wherein the regulation circuit controls a maximum value of the first charge signal such that the output voltage is regulated.

* * * * *